(12) United States Patent
Wada et al.

(10) Patent No.: US 11,039,029 B2
(45) Date of Patent: Jun. 15, 2021

(54) CONTROL SYSTEM, AND IMAGE FORMING APPARATUS THAT PROTECT IMAGE FORMING APPARATUS INSTALLED IN AREA WHERE ABNORMALITY HAS OCCURRED, FROM SECONDARY DISASTER

(71) Applicant: KYOCERA Document Solutions Inc., Osaka (JP)

(72) Inventors: Minoru Wada, Osaka (JP); Nobuhiro Maezawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/659,956

(22) Filed: Oct. 22, 2019

(65) Prior Publication Data

US 2020/0137251 A1     Apr. 30, 2020

(30) Foreign Application Priority Data

Oct. 26, 2018    (JP) .............................. JP2018-202282

(51) Int. Cl.
    *H04N 1/00*          (2006.01)
    *G06F 1/26*           (2006.01)
                (Continued)

(52) U.S. Cl.
    CPC ..... *H04N 1/00891* (2013.01); *H04N 1/00037* (2013.01); *H04N 1/00061* (2013.01);
                (Continued)

(58) Field of Classification Search
None
See application file for complete search history.

(56) References Cited

U.S. PATENT DOCUMENTS 5,509,108 A  *  4/1996 Yeh ..................... B41F 33/0009
                                               358/1.15
6,134,401 A  * 10/2000 Yun ..................... G03G 15/5004
                                                399/37

(Continued)

FOREIGN PATENT DOCUMENTS

JP            096559      *   1/1997      ............... G06F 3/12
JP      2009072922    *   4/2009      ............... H04N 1/00

(Continued)

OTHER PUBLICATIONS

The first office action in CN mailed by CNIPA (China National Intellectual Property Administration) dated Mar. 24, 2021 in The corresponding Chinese Patent Application No. 201910984122.1.

*Primary Examiner* — Beniyam Menberu (74) *Attorney, Agent, or Firm* — IP Business Solutions, LLC (57) ABSTRACT

An information processing apparatus manages an image forming apparatus installed in a building having a plurality of areas. The information processing apparatus includes an installation area information storage device, containing installation area information indicating each of the areas where the image forming apparatus is installed, a communication device that makes communication with an external apparatus, and a control device including a processor, and configured to acts as a controller, when the processor executes an operation control program. The controller transmits, when an abnormality detection device, provided in each of the areas to detect an abnormality that has occurred in the area, detects the abnormality, a command notice to turn off power for the image forming apparatus installed in the area where the abnormality has occurred, from the communication device to the image forming apparatus, (Continued)

according to the installation area information stored in the installation area information storage device.

3 Claims, 8 Drawing Sheets

(51) Int. Cl.
    *G06F 3/12*     (2006.01)
    *G06K 15/02*     (2006.01)
(52) U.S. Cl.
    CPC ....... *H04N 1/00082* (2013.01); *H04N 1/0097* (2013.01); *H04N 1/00344* (2013.01); *H04N 1/00981* (2013.01)

(56) References Cited

U.S. PATENT DOCUMENTS

| | | | | |
|---|---|---|---|---|
| 6,297,746 | B1* | 10/2001 | Nakazawa | G08C 17/02 340/12.5 |
| 10,476,696 | B2* | 11/2019 | Madhani | G06F 1/26 |
| 2009/0013765 | A1* | 1/2009 | Nakano | F17D 5/02 73/40.5 R |
| 2009/0040017 | A1* | 2/2009 | Nagasawa | G06F 1/3203 340/5.2 |
| 2009/0051956 | A1* | 2/2009 | Kondo | H04N 1/00323 358/1.13 |
| 2010/0033586 | A1* | 2/2010 | Kim | G08B 13/19645 348/211.6 |
| 2011/0261405 | A1* | 10/2011 | Ito | H04L 67/18 358/1.15 |
| 2014/0355022 | A1* | 12/2014 | Oda | H04N 1/00896 358/1.13 |
| 2015/0293728 | A1* | 10/2015 | Nishimura | G06F 3/1221 358/1.15 |
| 2016/0371040 | A1* | 12/2016 | Idehara | G06F 3/1222 |
| 2018/0314468 | A1* | 11/2018 | Osadchyy | G06F 3/1234 |
| 2020/0117407 | A1* | 4/2020 | Yoshimura | G06F 3/1239 |
| 2020/0236239 | A1* | 7/2020 | Wada | G06F 1/3206 |

FOREIGN PATENT DOCUMENTS

| | | | | |
|---|---|---|---|---|
| JP | 2010-062990 A | | 3/2010 | |
| JP | 2014225822 | * | 12/2014 | ............... G06F 3/12 |
| WO | 2011124224 A1 | | 10/2011 | |
| WO | WO 2011124224 | * | 10/2011 | ............. G08B 17/00 |

\* cited by examiner

| | AREA NUMBER |
|---|---|
| M001<br>(IMAGE FORMING APPARATUS 6A) | E1 |
| M002<br>(IMAGE FORMING APPARATUS 6B) | E2 |
| M003<br>(IMAGE FORMING APPARATUS 6C) | E2 |
| M004<br>(IMAGE FORMING APPARATUS 6D) | E3 |
| M005<br>(IMAGE FORMING APPARATUS 6E) | E3 |

CONTROL SYSTEM, AND IMAGE FORMING APPARATUS THAT PROTECT IMAGE FORMING APPARATUS INSTALLED IN AREA WHERE ABNORMALITY HAS OCCURRED, FROM SECONDARY DISASTER

INCORPORATION BY REFERENCE

This application claims priority to Japanese Patent Application No. 2018-202282 filed on Oct. 26, 2018, the entire contents of which are incorporated by reference herein.

BACKGROUND

The present disclosure relates to an information processing apparatus, a control system, and an image forming apparatus, and in particular to a technique to prevent a secondary disaster, when an abnormality occurs around the image forming apparatus.

Techniques to detect an abnormality that has occurred around an image forming apparatus, to thereby prevent a secondary disaster, have been proposed. For example, an image forming apparatus is known that is configured to detect an abnormality, to transmit abnormality information to outside and switch the power source to a secondary battery, or turn the power off, once an abnormality occurs.

In addition, disaster prevention systems, designed to announce, upon detecting an abnormality in a building such as fire, gas leakage, or intrusion of a suspicious person, the occurrence of the abnormality to sojourners in the building, and to automatically unlock locked doors once an earthquake occurs, are already in practical use.

SUMMARY

The present inventors have found out that utilizing abnormality detection devices provided in the mentioned disaster prevention system, such as a seismic sensor and a fire sensor, enables an abnormality that has occurred around the image forming apparatus to be detected, without the need to mount independent detection devices on each of the image forming apparatuses, and have accomplished the disclosure.

The disclosure proposes further improvement of the foregoing technique.

In an aspect, the disclosure provides an information processing apparatus that manages an image forming apparatus installed in a building having a plurality of areas. The information processing apparatus includes an installation area information storage device, a communication device, and a control device. The installation area information storage device contains installation area information indicating each of the areas where the image forming apparatus is installed. The communication device makes communication with an external apparatus. The control device includes a processor, and acts as a controller, when the processor executes an operation control program. The controller transmits, when an abnormality detection device, provided in each of the areas to detect an abnormality that has occurred in the area, detects the abnormality, a command notice to turn off power for the image forming apparatus installed in the area where the abnormality has occurred, from the communication device to the image forming apparatus, according to the installation area information stored in the installation area information storage device.

In another aspect, the disclosure provides a control system including an image forming apparatus installed in a building having a plurality of areas, and an information processing apparatus that manages the image forming apparatus. The information processing apparatus includes an installation area information storage device, a first communication device, and a first control device. The installation area information storage device contains installation area information indicating each of the areas where the image forming apparatus is installed. The first communication device makes communication with an external apparatus. The first control device includes a processor, and acts as a first controller, when the processor executes an operation control program. The first controller transmits, when an abnormality detection device, provided in each of the areas to detect an abnormality that has occurred in the area, detects the abnormality, a command notice to turn off power for the image forming apparatus installed in the area where the abnormality has occurred, from the first communication device to the image forming apparatus, according to the installation area information stored in the installation area information storage device. The image forming apparatus includes a second communication device and a second control device. The second communication device makes communication with an external apparatus. The second control device includes a processor, and acts as a second controller, when the processor executes a control program. The second controller turns off the power for performing a function of the image forming apparatus, when the second communication device receives the command notice transmitted from the information processing apparatus.

In still another aspect, the disclosure provides an image forming apparatus to be installed in a building having a plurality of areas. The image forming apparatus includes an installation area information storage device and a controller. The installation area information storage device contains installation area information indicating each of the areas where the image forming apparatus is installed. The controller turns off power for performing a function of the image forming apparatus, when an abnormality detection device, provided in each of the areas to detect an abnormality that has occurred in the area, detects the abnormality, according to the installation area information stored in the installation area information storage device, in a case where the image forming apparatus is installed in the area where the abnormality has occurred.

DETAILED DESCRIPTION

Figure 1:
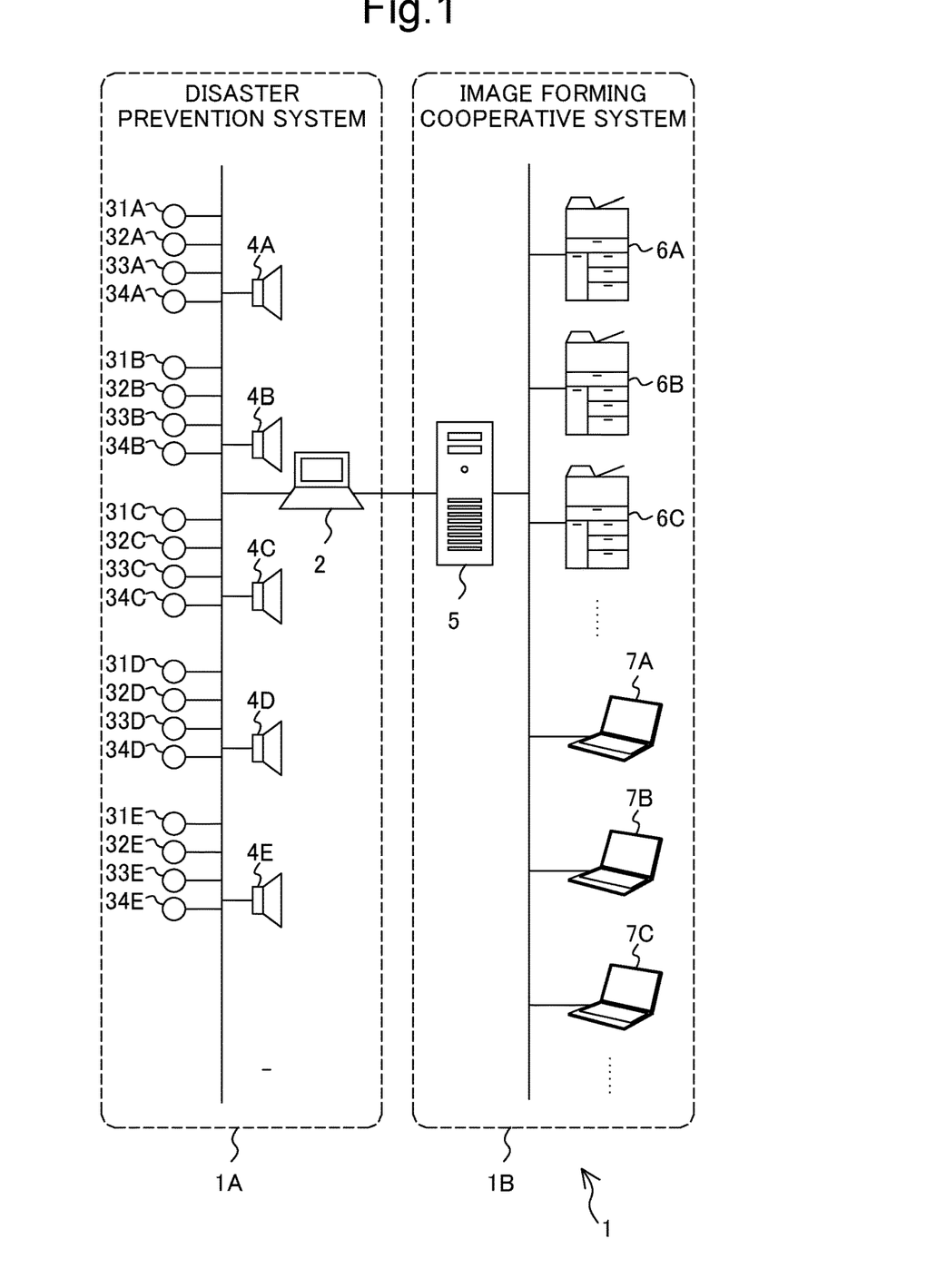
FIG. 1 is a schematic diagram showing an overall configuration of a control system according to an embodiment of the disclosure.
Figure 2:
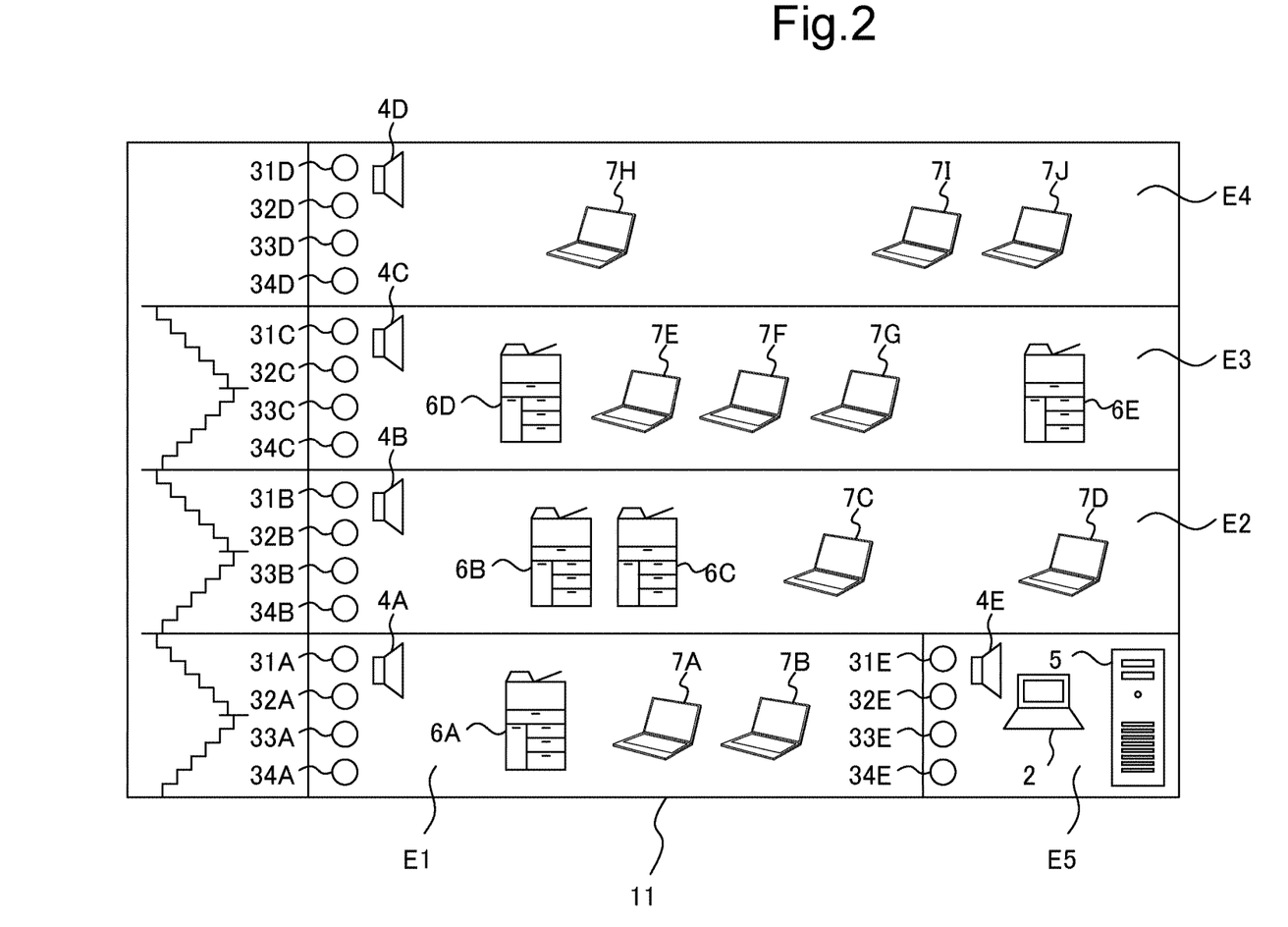
FIG. 2 is a schematic side view of a building, in which apparatuses constituting the control system are located.

Hereafter, an information processing apparatus, a control system, and an image forming apparatus according to an embodiment of the disclosure will be described, with reference to the drawings. FIG. 1 is a schematic diagram showing an overall configuration of the control system according to the embodiment of the disclosure. FIG. 2 is a schematic side view of a building, in which apparatuses constituting the control system are located.

The control system 1 includes an information processing apparatus 2, seismic sensors 31A to 31E (hereinafter, collectively "seismic sensor 31" as the case may be), fire sensors 32A to 32E (hereinafter, collectively "fire sensor 32" as the case may be), gas leakage sensors 33A to 33E (hereinafter, collectively "gas leakage sensor 33" as the case may be), infrared sensors 34A to 34E (hereinafter, collectively "infrared sensor 34" as the case may be), alarms 4A to 4E (hereinafter, collectively "alarm 4" as the case may be), a server 5, image forming apparatuses 6A to 6E (hereinafter, collectively "image forming apparatus 6" as the case may be), and terminal devices 7A to 7J (hereinafter, collectively "terminal device 7" as the case may be).

The image forming apparatus 6A and the terminal devices 7A and 7B are installed in the area E1 on the first floor of the building 11; the image forming apparatuses 6B and 6C and the terminal devices 7C and 7D are installed in the area E2 on the second floor; the image forming apparatuses 6D and 6E and the terminal devices 7E to 7G are installed in the area E3 on the third floor; and the terminal devices 7H to 7J are installed in the area E4 on the fourth floor. In the area E5 on the first floor, where a management room is located, the information processing apparatus 2 and the server 5 are installed.

The information processing apparatus 2, and the seismic sensor 31, the fire sensor 32, the gas leakage sensor 33, the infrared sensor 34, and the alarm 4 are connected to each other via a network such as a local area network (LAN), so that the information processing apparatus 2, the seismic sensor 31, the fire sensor 32, the gas leakage sensor 33, the infrared sensor 34, and the alarm 4 constitute a disaster prevention system 1A. The information processing apparatus 2 may be, for example, a personal computer (PC).

The seismic sensors 31A to 31E, the fire sensors 32A to 32E, the gas leakage sensors 33A to 33E, and the infrared sensors 34A to 34E are respectively provided in the areas E1 to E5 of the building 11, to detect an abnormality that has occurred in the corresponding one of the areas E1 to E5. The alarms 4A to 4E are respectively provided in the areas E1 to E5, to notify the occurrence of the abnormality to sojourners in the corresponding area. Here, the seismic sensor 31, the fire sensor 32, the gas leakage sensor 33, and the infrared sensor 34 each exemplify the abnormality detection device in the disclosure.

The seismic sensor 31 detects acceleration applied to each area of the building 11, to decide whether earthquake has occurred on the basis of the magnitude of the acceleration, and transmits the decision result to the information processing apparatus 2, as detection information acquired by the seismic sensor 31.

The fire sensor 32 detects a fire in each area of the building 11, for example by measuring smoke density with light, to decide whether a fire has occurred on the basis of the smoke density measured, and transmits the decision result to the information processing apparatus 2, as detection information acquired by the fire sensor 32.

The gas leakage sensor 33 detects fuel gas and carbon monoxide in each area of the building 11, to decide whether gas leakage has occurred on the basis of the density of the fuel gas or carbon monoxide, for example utilizing a semiconductor that varies the resistance upon reacting with fuel gas or carbon monoxide, and transmits the decision result to the information processing apparatus 2, as detection information acquired by the gas leakage sensor 33.

The infrared sensor 34 detects a person present at night (i.e., suspicious person) in each area of the building 11, to decide whether a suspicious person is present by receiving infrared light, and transmits the decision result to the information processing apparatus 2, as detection information acquired by the infrared sensor 34.

The information processing apparatus 2 transmits an action command to the alarm 4, upon receipt of the detection information transmitted from the abnormality detection device, such as the seismic sensor 31 or fire sensor 32. The alarm 4 outputs a notice based on the action command received, thereby notifying the occurrence of the abnormality to the sojourners in the building 11.

The server 5 is connected to the image forming apparatus 6 and the terminal device 7 via a network such as LAN, so that the server 5 can exchange information with the image forming apparatus 6 and the terminal device 7. Thus, the server 5, the image forming apparatus 6, and the terminal device 7 constitute an image forming cooperative system 1B. The image forming apparatus 6 can be exemplified by a multifunction peripheral having a plurality of functions, such as copying, printing, scanning, and facsimile transmission, and the terminal device 7 can be exemplified by a PC.

The server 5 also serves to repeat an operation instruction from the terminal device 7 to the image forming apparatus 6, and receive apparatus status information transmitted from the image forming apparatus 6 and indicating the status thereof (e.g., status of power source, and type of job), to monitor and manage the status of the image forming apparatus 6.

The information processing apparatus 2 is connected to the server 5 to exchange information with the server 5, and also with the image forming apparatus 6 via the server 5. For example, the information processing apparatus 2 receives the apparatus status information transmitted from the image forming apparatus 6, to monitor and manage the status of the image forming apparatus 6, like the server 5. The information processing apparatus 2 also transmits a command notice to turn off the power for the image forming apparatus 6, via the server 5 to the image forming apparatus 6.

Upon receipt of the command notice transmitted from the information processing apparatus 2 via the server 5, the image forming apparatus 6 turns off the power therefor, according to the command notice received.

Figure 3:
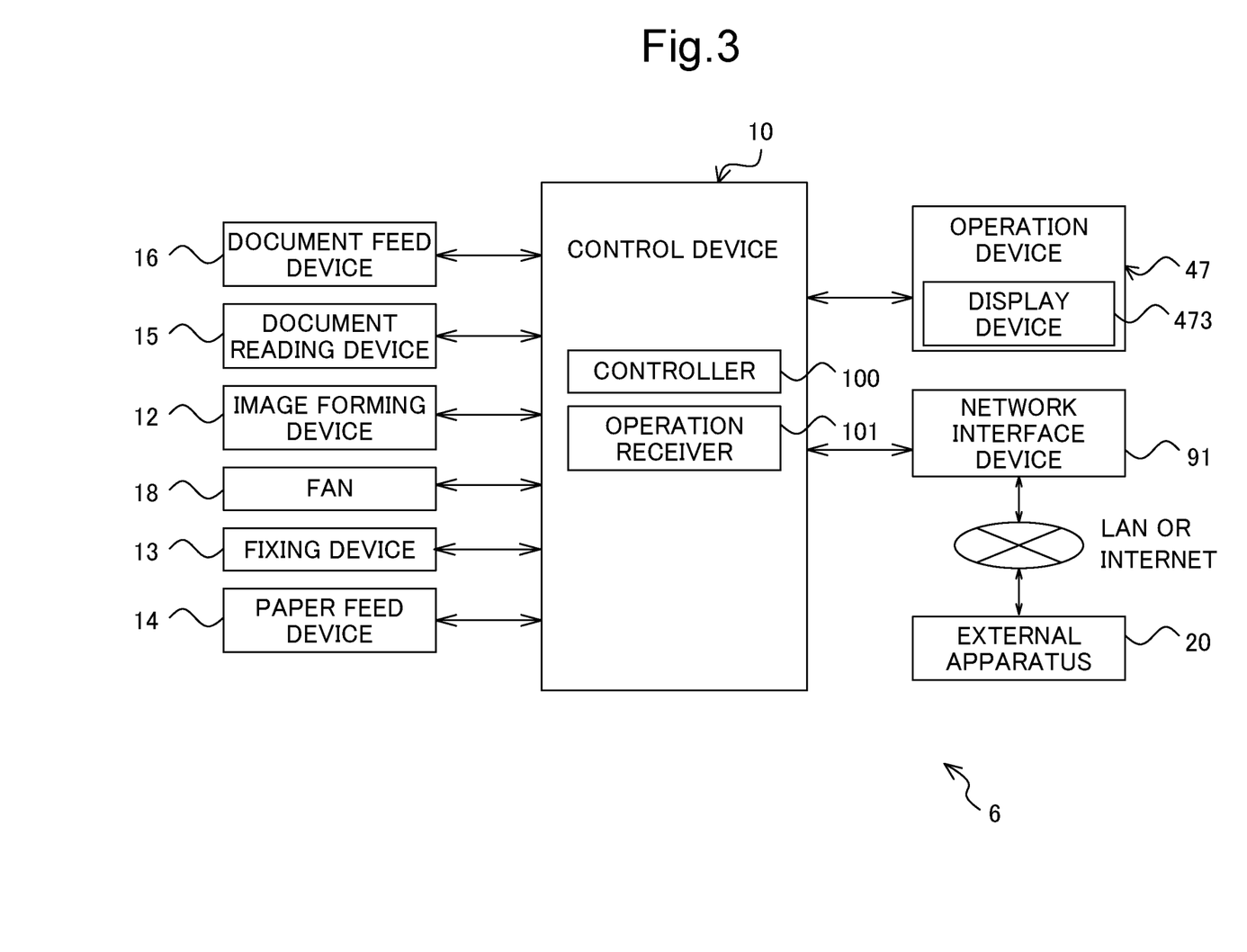
FIG. 3 is a functional block diagram showing an essential internal configuration of an image forming apparatus constituting the control system.

FIG. 3 is a functional block diagram showing an essential internal configuration of the image forming apparatus 6 constituting the control system 1. The image forming apparatus 6 includes a control device 10, a document feed device 16, a document reading device 15, an image forming device 12, a fan 18, a fixing device 13, a paper feed device 14, an operation device 47, and a network interface device 91.

In the image forming apparatus 6, the document reading operation is performed as follows. The document reading device 15 optically reads the image on a source document delivered from the document feed device 16 or placed on a non-illustrated contact glass, and generates image data. The image data generated by the document reading device 15 is stored, for example, in a non-illustrated image memory.

In the image forming apparatus 6, the image forming operation is performed as follows. The image forming device 12 forms a toner image on a recording sheet, serving as a recording medium and delivered from the paper feed device 14, on the basis of the image data generated through the document reading operation, or received from an external apparatus 20 connected to the network, such as a computer (e.g., server 5).

The fan 18 serves to cool the internal space of the image forming apparatus 6. The fixing device 13 heats and presses the recording sheet, on which the toner image has been formed by the image forming device 12, thereby fixing the toner image onto the recording sheet. The recording sheet with the toner image fixed thereon is discharged to a non-illustrated output tray. The paper feed device 14 includes one or more paper feed cassettes.

The operation device 47 receives instructions from the operator, for operations and processes that the image forming apparatus 6 is configured to perform, such as the image forming operation. The operation device 47 includes a display device 473 for displaying a guidance and so forth to the operator.

The display device 473 has a touch panel function, so that the operator can operate the image forming apparatus 6 by touching a button or an icon displayed on the screen of the display device 473.

The network interface device 91 serves to transmit and receive various types of data, to and from the external apparatus 20 in the local area or on the internet, such as the terminal device 7 or the server 5. Here, the network interface device 91 exemplifies the second communication device in the disclosure.

The control device 10 includes a processor, a random-access memory (RAM), a read-only memory (ROM), a single-purpose hardware circuit, and so forth. The processor is, for example, a central processing unit (CPU), a micro processing unit (MPU), an application specific integrated circuit (ASIC). The control device 10 includes a controller 100 and an operation receiver 101. Here, the control device 10 exemplifies the second control device in the disclosure.

The control device 10 acts as the controller 100 and the operation receiver 101, by operating according to a control program stored in a non-illustrated hard disk drive (HDD). However, the controller 100 and the operation receiver 101 may each be constituted of a hardware circuit, instead of being realized by the operation of the control device 10 according to the image processing program. This also applies to other embodiments, unless otherwise specifically noted.

The controller 100 serves to control the overall operation of the image forming apparatus 6. The control device 10 is connected to the document feed device 16, the document reading device 15, the image forming device 12, the fan 18, the fixing device 13, the paper feed device 14, the operation device 47, and the network interface device 91. The controller 100 controls the operation of the mentioned components. Here, the controller 100 exemplifies the second controller in the disclosure.

The controller 100 transmits the apparatus status information indicating the status of the image forming apparatus 6, to the server 5 via the network interface device 91. Examples of the apparatus status information include the information to the effect that the printing, copying, scanning, or facsimile function has been utilized, that a job has been executed using a USB memory, that the power has been turned on, and that the power has been turned off.

Further, when the network interface device 91 receives the command notice transmitted from the information processing apparatus 2 via the server 5, the controller 100 controls the image forming apparatus 6 according to the command notice received.

The operation receiver 101 receives inputs from the user made through the operation device 47. For example, the operation receiver 101 receives an operation of the user performed on hard keys provided on the operation device 47, and also an operation of the user performed on the screen of the display device 473, by means of the touch panel function of the display device 473. The controller 100 controls the operation of the image forming apparatus 6, according to the operation of the user received by the operation receiver 101.

Figure 4:
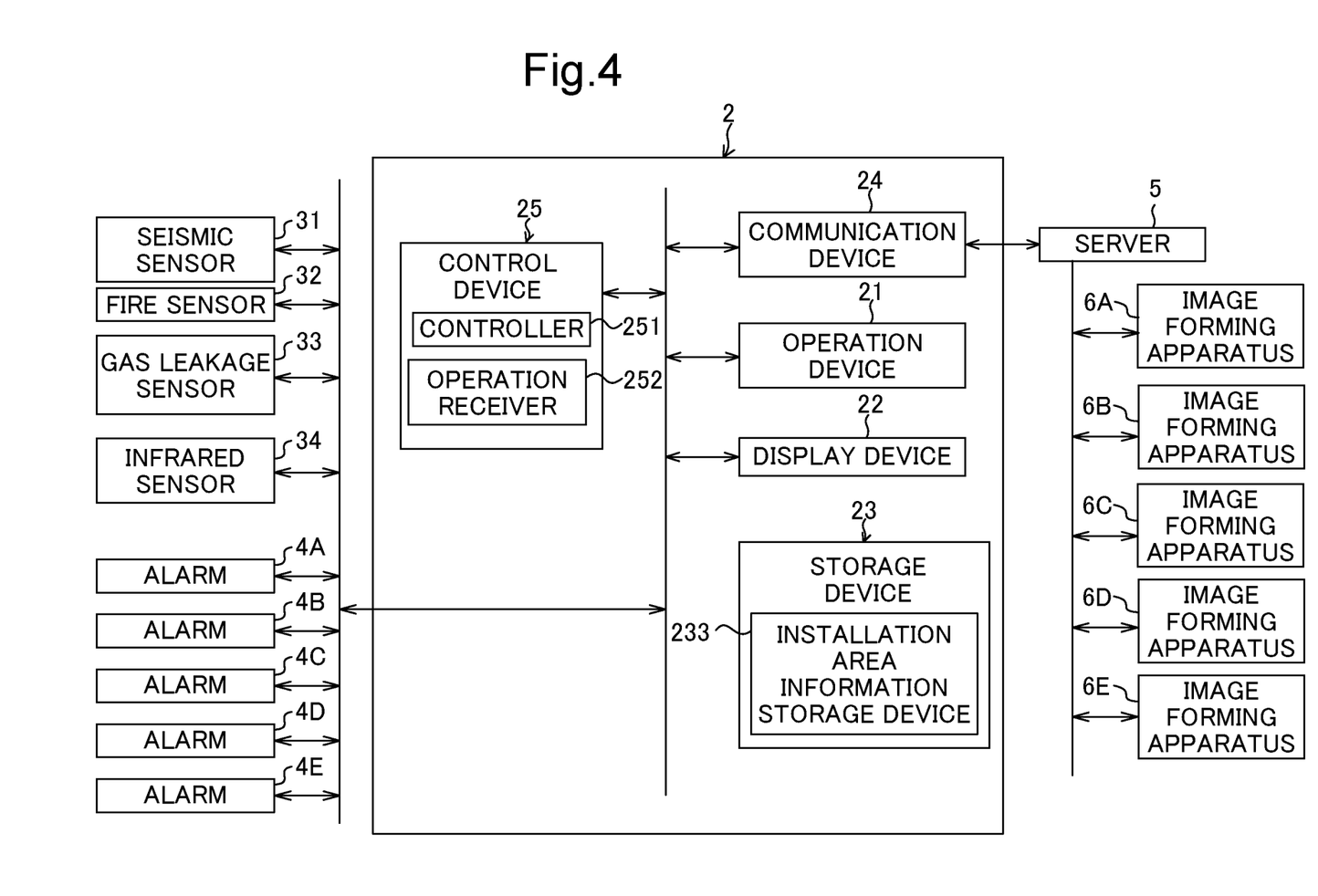
FIG. 4 is a functional block diagram showing an essential internal configuration of an information processing apparatus constituting the control system.

FIG. 4 is a functional block diagram showing an essential internal configuration of the information processing apparatus 2 constituting the control system 1. The information processing apparatus 2 includes an operation device 21, a display device 22, a storage device 23, a communication device 24, and a control device 25. These components can transmit and receive data or signals to and from each other, via a communication path.

The operation device 21 includes a keyboard and a mouse, to input a command or character to the control device 25, and move the pointer on the screen of the display device 22, according to the operation of the user. The display device 22 display a response from the control device 25, and a data result.

The storage device 23 is a storage medium such as a HDD containing programs and data necessary for operating the information processing apparatus 2, and includes an installation area information storage device 233. The installation area information storage device 233 contains installation area information, indicating each of the areas in the building 11 where the image forming apparatuses 6A to 6E are installed.

Figure 5:
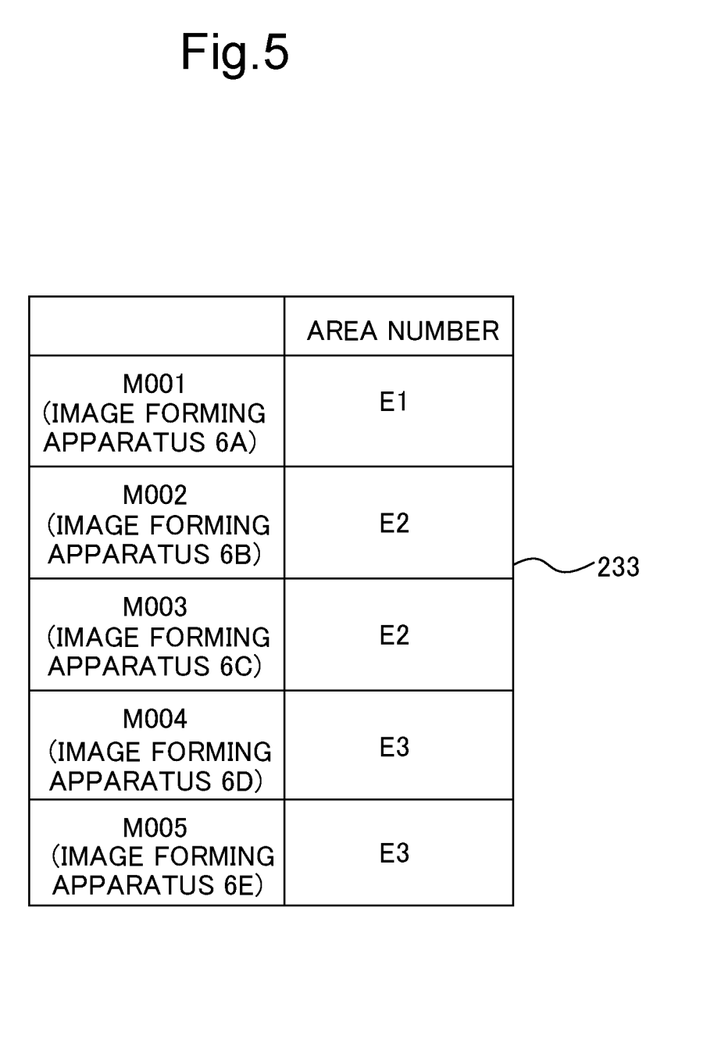
FIG. 5 is a table showing a data arrangement stored in an installation area information storage device.

FIG. 5 is a table showing a data arrangement stored in the installation area information storage device 233. As shown in FIG. 5, the installation area information storage device 233 contains the area numbers of the image forming apparatuses 6A to 6E, in association with the respective apparatus numbers "M001" to "M005". For example, it is understood that the image forming apparatus 6A, numbered as "M001", is installed in the area E1, from the data contained in the installation area information storage device 233.

The communication device 24 is a communication interface including a communication module such as a non-illustrated LAN chip, and makes communication with the external apparatus (e.g., server 5, image forming apparatus 6). The information processing apparatus 2 is connected to the server 5 via the communication device 24, to transmit and receive data to and from the server 5, and also to and from the image forming apparatus 6 via the server 5. Here, the communication device 24 exemplifies the first communication device in the disclosure.

The control device 25 includes a processor, a RAM, a ROM, and a single-purpose hardware circuit. The processor is, for example, a CPU, an ASIC, or a MPU. The control device 25 includes a controller 251 and an operation receiver 252. Here, the control device 25 exemplifies the first control device in the disclosure.

The control device 25 acts as the controller 251 and the operation receiver 252, when the processor operates according to an operation control program stored in the storage device 23. However, the functions of the control device 25 may each be realized by a hardware circuit, instead of being realized by the operation of the control device 25 according to the image processing program. This also applies to other embodiments, unless otherwise specifically noted.

The controller 251 serves to control the overall operation of the image processing apparatus 2. The controller 251 is connected to the operation device 21, the display device 22, the storage device 23, and the communication device 24, and controls the operation of the mentioned components, as well as transmits and receives data and signals to and from those components. Here, the controller 251 exemplifies the first controller in the disclosure.

The operation receiver 252 receives inputs made by the user through the operation device 21.

The controller 251 transmits an action command based on the detection information to the alarm 4, upon deciding that an abnormality has occurred in any of the areas E1 to E5, according to the detection information transmitted from the abnormality detection device, namely the seismic sensor 31, the fire sensor 32, the gas leakage sensor 33, or the infrared sensor 34. Further, the controller 251 immediately transmits the command notice to turn off the power for the image forming apparatus 6 installed in the area where the abnormality has occurred, from the communication device 24 to the image forming apparatus 6 via the server 5, according to the installation area information stored in the installation area information storage device 233.

Upon receipt of the command notice transmitted from the information processing apparatus 2, the image forming apparatus 6 turns off the power for performing the functions thereof, according to the command notice received. More specifically, upon receipt of the command notice transmitted from the information processing apparatus 2, the image forming apparatus 6 turns off a sub power source for activating the functions thereof, according to the command notice received, but keeps the main power source turned on. Here, the image forming apparatus 6 is restricted from turning the power on, before receiving a cancel notice transmitted from the information processing apparatus 2.

The cancel notice, for cancelling the command to turn off the power, is transmitted only after the user has visually confirmed the safety in the area. When the user instructs to cancel the command to turn off the power for the image forming apparatus 6 through the operation device 21, the controller 251 transmits the cancel notice from the communication device 24 to the image forming apparatus 6, via the server 5.

Figure 6:
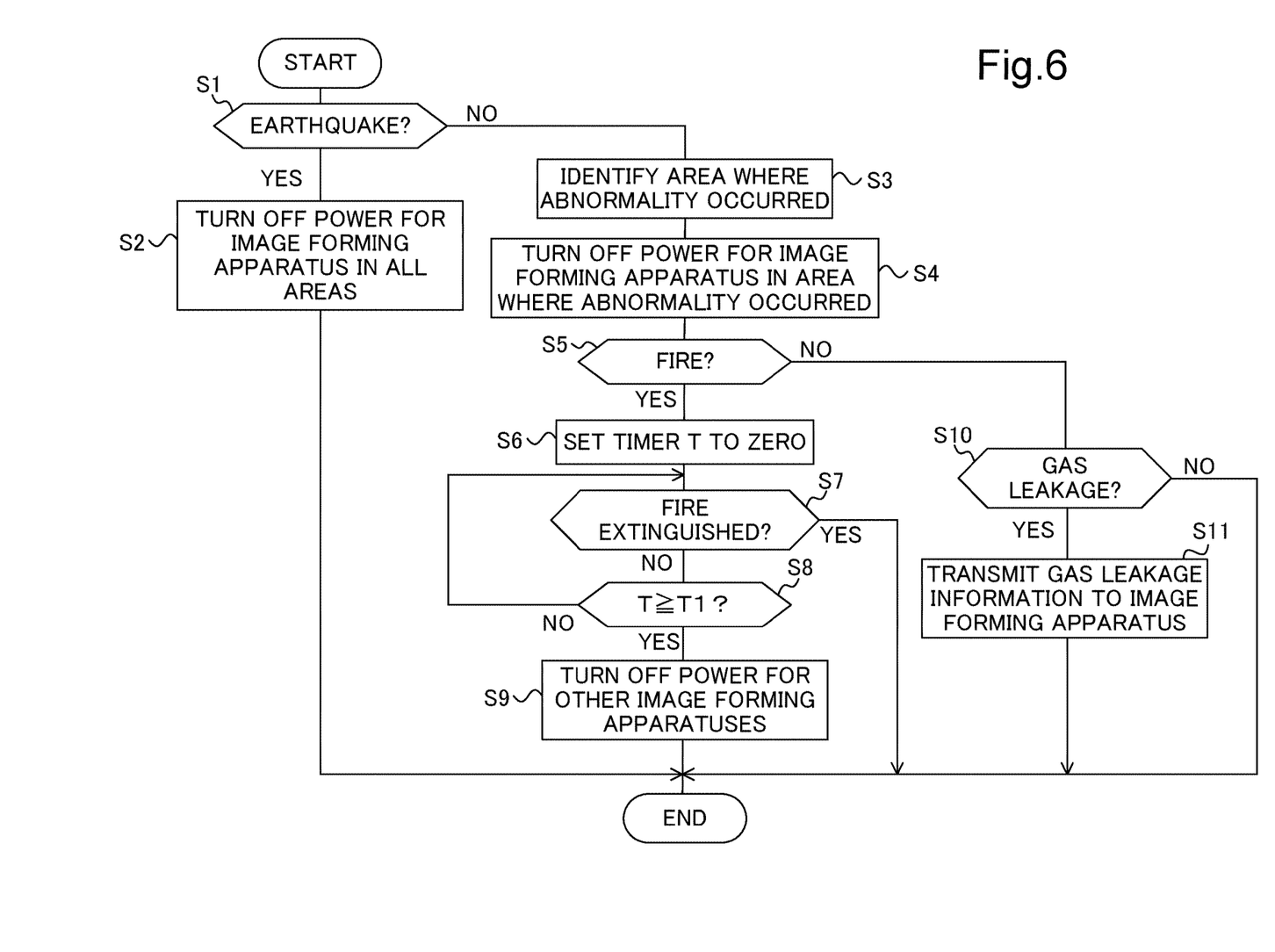
FIG. 6 is a flowchart showing an operation performed by a control device of the information processing apparatus.

Referring now to the flowchart of FIG. 6, an operation performed by the control device 25 of the information processing apparatus 2 will be described hereunder. The following operation is to be performed when the controller 251 decides that an abnormality has occurred in one of the areas E1 to E5, on the basis of the detection information from the abnormality detection device, such as the seismic sensor 31 or fire sensor 32.

Upon deciding that an abnormality has occurred in one of the areas E1 to E5, on the basis of the detection information from the abnormality detection device such as the seismic sensor 31, the controller 251 decides whether the abnormality that has occurred is an earthquake, on the basis of the detection information (S1).

Upon deciding that the abnormality that has occurred is an earthquake (YES at S1), the controller 251 transmits the command notice to turn off the power for the image forming apparatus 6, to all of the image forming apparatuses 6A to 6E installed in the building 11, from the communication device 24 via the server 5, on the basis of the installation area information stored in the installation area information storage device 233 (S2). Thereafter, the operation is finished.

The controller 100 of the image forming apparatus 6 turns off, upon receipt of the command notice transmitted from the information processing apparatus 2 through the network interface device 91, the power for performing the functions of the image forming apparatus 6.

Upon deciding that the abnormality that has occurred is not an earthquake (NO at S1), the controller 251 identifies the area where the abnormality has occurred, on the basis of the detection information (S3), and transmits the command notice to the image forming apparatus 6 installed in the area where the abnormality has occurred (S4). For example, when one of the fire sensor 32B, the gas leakage sensor 33B, and the infrared sensor 34B provided in the area E2 of the building 11 detects the abnormality, the controller 251 transmits the command notice to the image forming apparatuses 6B and 6C installed in the area E2, where the abnormality has occurred.

The controller 251 then decides whether the abnormality that has occurred is a fire (S5). Upon deciding that the abnormality that has occurred is a fire (YES at S5), the controller 251 activates a timer T incorporated in the control device 25 from zero, to measure the elapsed time after the fire occurred (S6).

Then the controller 251 decides whether the fire has been extinguished, on the basis of the detection information from the fire sensor 32, which detected the occurrence of the fire (S7), and finishes the operation upon deciding that the fire has been extinguished (YES at S7). Upon deciding that the fire has not been extinguished (NO at S7), the controller 251 decides whether a predetermined time T1 has elapsed, according to the timer T (S8).

Upon deciding that the time T1 has been elapsed (YES at S8), the controller 251 transmits the command notice to the image forming apparatuses 6 installed in the areas where the fire has not occurred (S9), because it is probable that initial firefighting has failed, and finishes the operation. When the controller 251 decides that the time T1 has not elapsed, according to the timer T (NO at S8), the operation returns to S7.

Upon deciding that the abnormality that has occurred is not a fire (NO at S5), the controller 251 decides whether the abnormality that has occurred is gas leakage (S10). Upon deciding that the abnormality that has occurred is gas leakage (YES at S10), the controller 251 transmits gas leakage information indicating that the abnormality that has occurred is gas leakage, from the communication device 24 to the image forming apparatus 6 installed in the area where the gas leakage has occurred (S11), and finishes the operation. When the controller 251 decides that the abnormality that has occurred is not gas leakage (i.e., intrusion of a suspicious person instead) (NO at S10), the operation is finished.

Figure 7:
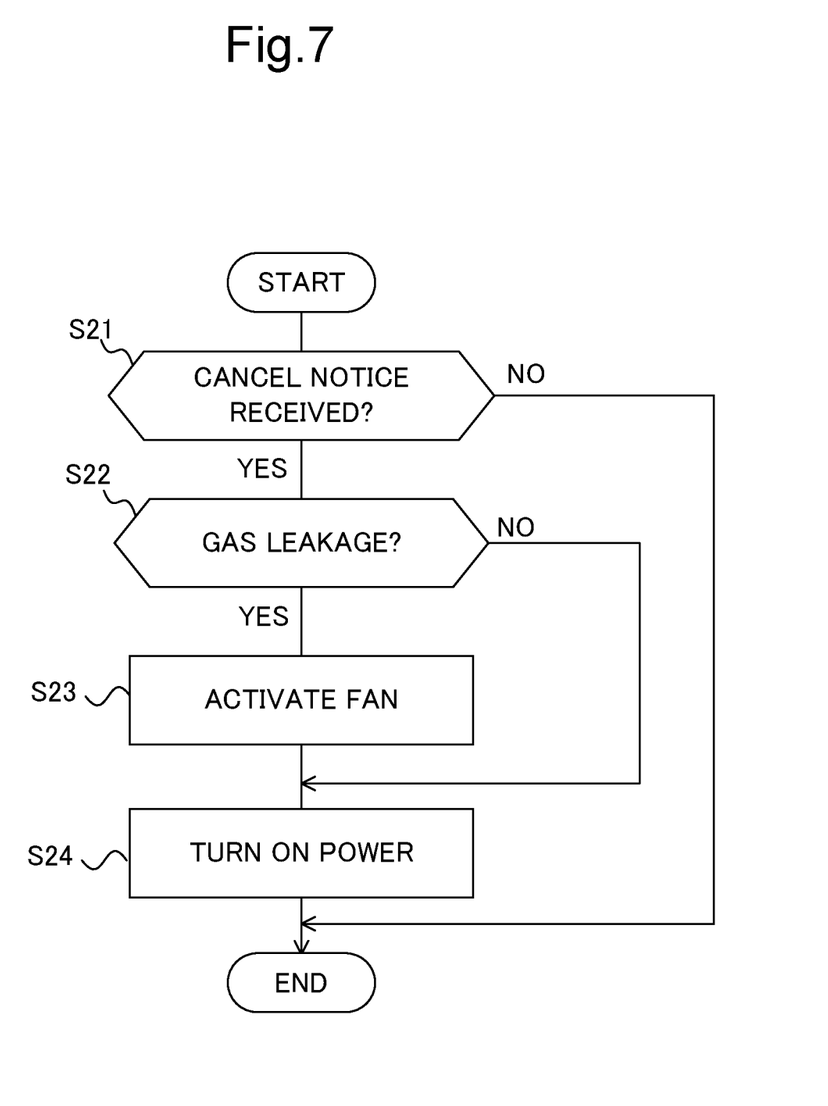
FIG. 7 is a flowchart showing an operation performed by a control device of the image forming apparatus.

Referring to the flowchart of FIG. 7, an operation performed by the control device 10 of the image forming apparatus 6 will be described hereunder. The following operation is to be performed when the user operates a non-illustrated power switch of the image forming apparatus 6, after the power for the image forming apparatus 6 is turned off according to the command notice.

Upon deciding that the user has operated the power switch, the controller 100 decides whether the network interface device 91 has already received the cancel notice transmitted from the information processing apparatus 2 (S21). Upon deciding that the cancel notice has already been received (YES at S21), the controller 100 decides whether the abnormality that has occurred is gas leakage (S22). In the case where the gas leakage information transmitted from the information processing apparatus 2 has been received, the controller 100 decides that the abnormality that has occurred is gas leakage.

Upon deciding that the abnormality that has occurred is gas leakage (YES at S22), the controller 100 activates the fan 18 to sufficiently ventilate the inner space of the image forming apparatus 6 (S23), before performing a warm-up, normally carried out upon turning on the power. Thereafter the controller 100 turns on the power for the image forming apparatus 6 (S24), and finishes the operation. Upon deciding that the abnormality that has occurred is not gas leakage (NO at S22), the controller 100 turns on the power for the image forming apparatus 6 (S24), and finishes the operation.

In the case where the controller 100 decides at S21 that the cancel notice has not yet been received (NO at S21), the operation is finished, since the power for the image forming apparatus 6 is restricted from being turned on.

The arrangement according to the foregoing embodiment allows the power for the image forming apparatus 6, installed in the area where the abnormality (e.g., earthquake, fire, gas leakage, or intrusion of a suspicious person) has occurred, to be turned off, thereby effectively preventing a secondary disaster that may otherwise fall on the image forming apparatus 6.

Now, the technique according to the background art is prepared for earthquake, fire, gas leakage, and intrusion of a suspicious person as the abnormality. To cope with all of the mentioned cases, each image forming apparatus has to be provided with a plurality of types of sensors. In addition, similar actions are taken when an abnormality occurs, regardless of the type of the abnormality, according to the background art. However, there may be cases where it is more desirable to vary the action of the image forming apparatus depending on the type of the abnormality, from the viewpoint of more effective prevention of the occurrence of a secondary disaster.

According to the foregoing embodiment, in contrast, the secondary disaster that may fall on the image forming apparatus, installed in the area where the abnormality has occurred, can be effectively prevented with a relatively simple configuration.

When the image forming apparatus falls down owing to the earthquake, the apparatus may be damaged. In addition, though the apparatus itself has not fallen down, an object that has dropped may damage the apparatus. In such cases, it is preferable to turn off the power for the apparatus, because leaving the apparatus continuing with the operation may expand the damage of the apparatus.

Further, it is preferable to turn off the power for the apparatus in case of fire or gas leakage, since the image forming apparatus includes various electronic parts and heaters. In addition, the image forming apparatus may contain confidential information, and therefore it is preferable to turn off the power, also when a suspicious person has intruded.

Since it is restricted to turn on the power for the image forming apparatus 6, until the cancel notice is received from the information processing apparatus 2, in other words until the user visually confirms the safety, the power is prevented from being turned on while it is not sure whether the safety is secured.

In case of earthquake, the power for all of the image forming apparatuses 6 installed in the building 11 is turned off. In contrast, in case of other types of abnormality, such as fire, gas leakage, or intrusion of a suspicious person, only those image forming apparatuses 6 installed in the area where the abnormality has occurred. Therefore, degradation in convenience of use can be prevented.

Further, when it is probable that initial firefighting has failed, the image forming apparatuses 6 installed in the areas where the fire has not occurred are also turned off. In case of gas leakage, the fan is activated to ventilate the inner space of the image forming apparatus 6, before performing the warm-up. Such arrangements further assure the prevention of expansion of the damage.

As the abnormality detection device, the seismic sensor 31, the fire sensor 32, and other sensors constituting the disaster prevention system 1A can be utilized, and therefore an increase in cost can be depressed. Accordingly, a secondary disaster that may fall on the image forming apparatus 6, installed in the areas where the abnormality has occurred, can be effectively prevented with a reduced cost.

Although the foregoing embodiment refers to the case where the information processing apparatus 2 turns off the power for the image forming apparatus 6 installed in the area E where an abnormality has occurred, the server 5 may also include the installation area information storage device 233, like the information processing apparatus 2, to perform the same operation.

Figure 8:
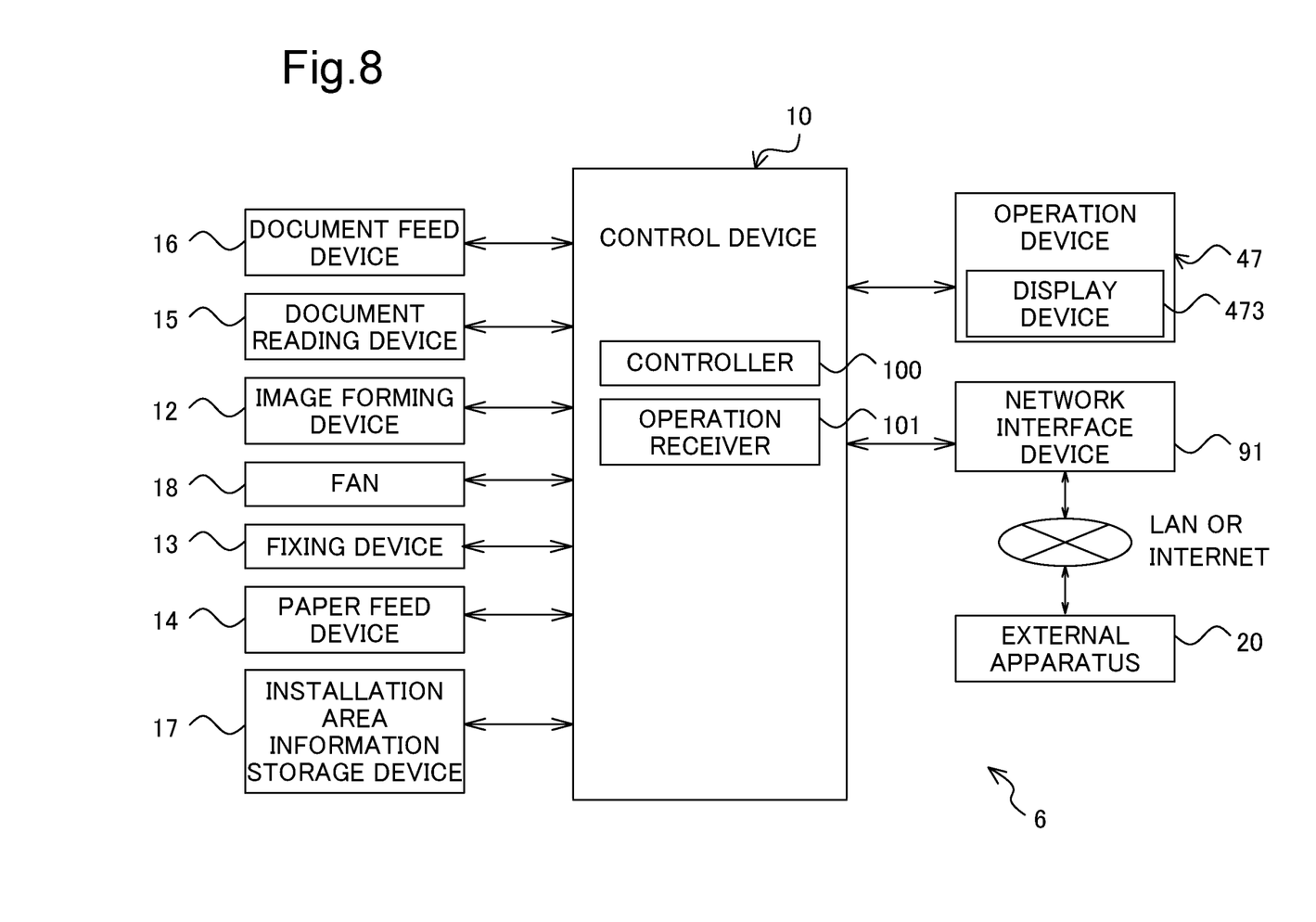
FIG. 8 is a functional block diagram showing an essential internal configuration of an image forming apparatus according to another embodiment.

Hereunder, the image forming apparatus 6 according to another embodiment will be described. FIG. 8 is a functional block diagram showing an essential internal configuration of an image forming apparatus according to the other embodiment. The image forming apparatus 6 according to the other embodiment includes an installation area information storage device 17 (see FIG. 8) containing installation area information indicating each of the areas where the image forming apparatus 6 (i.e., own apparatus) is installed, so that the controller 100 may turn off the power for the own apparatus, when the own apparatus is installed in the area where an abnormality has occurred.

Alternatively, the image forming apparatus 6 may include the installation area information storage device 17 (see FIG. 8) containing the installation area information indicating each of the areas where the image forming apparatus (own apparatus) and another image forming apparatus (another apparatus) are installed, to turn off the power for the own apparatus and the other apparatus installed in the area where an abnormality has occurred. To turn off the power for the other apparatus, not the own apparatus, the controller 100 of the image forming apparatus 6 may transmit the command notice to turn off the power for the other apparatus, from the network interface device 91 via the server 5.

The disclosure is not limited to the foregoing embodiments, but may be modified in various manners. The configurations and arrangements according to the foregoing embodiment, described with reference to FIG. 1 to FIG. 8, are merely exemplary, and in no way intended to limit the disclosure to those configurations and arrangements.

While the present disclosure has been described in detail with reference to the embodiments thereof, it would be apparent to those skilled in the art the various changes and modifications may be made therein within the scope defined by the appended claims.

What is claimed is:

1. A control system comprising:
an image forming apparatus installed in a building having a plurality of areas; and
an information processing apparatus that manages the image forming apparatus,
wherein the information processing apparatus includes:

an installation area information storage device that contains installation area information indicating one of the areas where the image forming apparatus is installed;
a first communication device that makes communication with an external apparatus; and
a first control device including a first processor, and configured to act as a first controller, when the first processor executes an operation control program,
the first controller transmits, when an abnormality detection device, provided in each of the areas to detect an abnormality that has occurred in the area, detects the abnormality, a command notice to turn off power for the image forming apparatus installed in the area where the abnormality has occurred, from the first communication device to the image forming apparatus, according to the installation area information stored in the installation area information storage device,
the image forming apparatus includes:
a second communication device that makes communication with an external apparatus; and
a second control device including a second processor, and configured to acts as a second controller, when the second processor executes a control program, and
the second controller turns off the power for performing a function of the image forming apparatus, when the second communication device receives the command notice transmitted from the information processing apparatus,
wherein the information processing apparatus further includes an operation device to be operated by a user,
the first controller transmits a cancel notice to cancel the command to turn off the power, to the image forming apparatus from the first communication device, when the user instructs, through the operation device, to cancel the command to turn off the power, and
the second controller of the image forming apparatus turns on the power, when the user operates a power switch of the image forming apparatus while the power is off in accordance with the command notice, provided that the second communication device has received the cancel notice transmitted from the information processing apparatus, but keeps the power from being turned on, in a case where the second communication device has not received the cancel notice.

2. The control system according to claim 1,
wherein, when the abnormality detection device detects gas leakage, the first controller transmits gas leakage information indicating that the abnormality that has occurred is gas leakage, to the image forming apparatus installed in the area where the gas leakage has occurred, from the first communication device,
the image forming apparatus further includes a fan, and
the second controller activates the fan before performing warm-up according to a normal schedule, when the user operates the power switch of the image forming apparatus, while it is recognized that the power is off because of the gas leakage, according to the gas leakage information received by the second communication device.

3. An image forming apparatus to be installed in a building having a plurality of areas, the image forming apparatus comprising:
an installation area information storage device that contains installation area information indicating one of the areas where the image forming apparatus is installed; and
a controller that turns off power for performing a function of the image forming apparatus, when an abnormality detection device, provided in each of the areas to detect an abnormality that has occurred in the area, detects the abnormality, according to the installation area information stored in the installation area information storage device, in a case where the image forming apparatus is installed in the area where the abnormality has occurred,
the image forming apparatus, further comprising a communication device for communication with an external apparatus,
wherein the installation area information storage device contains installation area information indicating each of the areas where the image forming apparatus and another image forming apparatus are installed,
the controller turns off the power for performing the function of the image forming apparatus and the other image forming apparatus, according to the installation area information stored in the installation area information storage device, when the abnormality detection device, provided in each of the areas to detect an abnormality that has occurred in the area, detects the abnormality, and
the controller transmits, when turning off the power for the other image forming apparatus, a command notice to turn off the power to the other image forming apparatus, from the communication device.

* * * * *